INVENTOR
Jürgen Paetow

BY *[signature]*

ATTORNEY

United States Patent Office 3,168,826
Patented Feb. 9, 1965

3,168,826
ATMOSPHERIC PRESSURE COMPENSATION
OF LOAD CELLS
Jürgen Paetow, Pallaswiesenstrasse 34,
Darmstadt, Germany
Filed Apr. 12, 1961, Ser. No. 102,570
3 Claims. (Cl. 73—141)

The present invention relates to a force measuring system with a measuring element surrounded by an air-tight housing which protrudes from the housing either itself or by means of a force transmitting element with an air-tight seal.

In force measuring systems it is frequently required that the measuring element proper be surrounded by a housing, which then often is made air-tight. The force to be measured is transmitted to the measuring element via a force transmitting element, whose exit through the wall of the housing must be sealed. In order to transmit as little as possible of the force to be measured through the seal of the housing, the seal should be as flexible as possible.

If, however, differences occur between ambient pressure and inside pressure of the housing, as may be caused by variations in air pressure or temperature, the differential force acts via the sealing means and force transmitting element on the measuring element proper, thereby changing the measured result.

The invention is designed to avoid this disadvantage in that the measuring element, or force transmitting element, uses a further connection to the housing in order to compensate for a first effect of force on the measuring element due to an over- or underpressure inside the housing as a consequence of its connection to the housing at the point of exit, the additional connection bringing into effect a second force opposed in direction to the first effect of force. The essence of the invention lies thus in the face that to the element transmitting the force to the measuring element, or the measuring element itself, which as a consequence of its more or less flexible connection to the housing is subject to the effect of a possible difference in pressure at the point of exit, is applied a force which compensates for this effect.

The spirit of the invention can be varied according to the arrangement and principles of operation of the unit comprising the measuring and transmitting elements. For instance, the force-transmitting element can be connected via flexible means to two housing surfaces lying in the measuring axis of the force measuring system opposed to one another, or the measuring member or force transmitting member can be connected via a suitable force deflecting device to any side of the housing, even to the side where the point of exit has been provided.

One embodiment of the invention is a device which uses a bending bar for the measuring element on whose free end acts a force-transmitting rod, which starting from the point of application of the force runs in two directions opposed by 180° and is connected to the housing in equal manner at the two points of exit.

Another embodiment of the invention uses a compression or tension rod for the measuring element which is designed as a force transmitting element at its one end; in this case the force transmitting element is provided with a rigid member running symmetrically with the axis of the measuring element, being connected in equal manner to the housing surfaces at both ends of the measuring element. The invention is not limited to these two embodiments, but allows its spirit to be varied for logical application to conventional measuring systems.

Other objects and advantages will be more apparent to those skilled in the art from the following description of the accompanying drawings in which.

Figure 1:
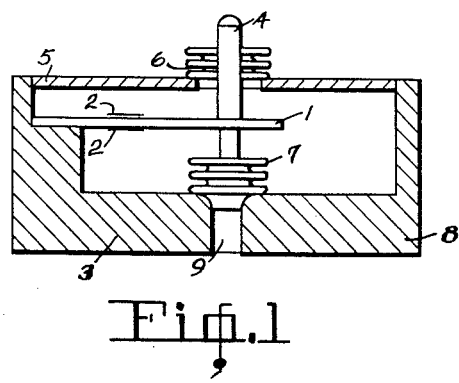
FIG. 1 is a device using a bending bar as the measuring element.

FIG. 1 shows a bending bar 1 clamped at one end to, and surrounded by, a housing 3, with strain gages 2 which serve to sense the bending stresses proportional to the force applied to the free end of the bending bar. Such gages are preferably, but not necessarily, of the well-known bonded electrical resistance filament type. The force to be measured is transmitted via a rod 4 to the free end of the bending bar 1. This rod passes through cover 5 of housing 3 in outside direction, the point of exit being sealed by a bellows 6. In order to compensate for the over- or underpressure inside the housing 3, which might affect the measuring element 1, rod 4 continues in the measuring axis of the force measuring device to the opposite housing surface (in the present case the bottom of the housing 8) and is connected to this in the indicated manner by means of a bellows 7 whose inside is in connection with the outside atmosphere through a passage 9. To the transmitting rod 4 and hence to the measuring element 1 are thus applied, as a consequence of inside over- or underpressure, two opposite forces whose equal magnitude causes them to cancel each other.

Figure 2:
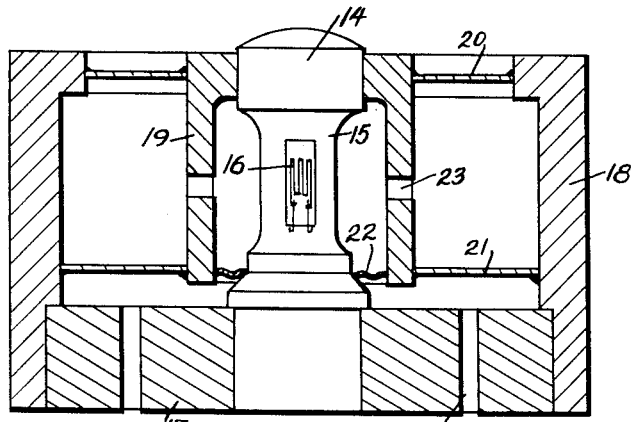
FIG. 2 is a device using a measuring element which is designed as a compression or tension rod.

In the modification of FIG. 2 the force transmitting means 14 and force responsive element 15 are coaxial and preferably in the form of an integral column, the measuring element 15 being a reduced strain concentrating portion upon which are mounted strain gages 16 preferably of the electric resistance bonded filament type. The lower portion of this column has force transmitting engagement with a base 17 on which a cylindrical housing shell 18 is mounted. A cylindrical sleeve 19 is securely held on to and hermetically sealed to the force transmitting means 14 which extends to the exterior of the housing. This sleeve is vertically guided by upper and lower axially spaced annular diaphragms 20 and 21 suitably hermetically sealed by brazing or other suitable means at their inner and outer edges to the sleeve 19 and shell 18. An annular flexible sealing member 22, preferably with annular corrugations, of any suitable well-known metal, rubber or other flexible sealing material is connected at its inner and outer edges to the lower portion of column 14 and sleeve 19. Passages 23 permit electrical lead wires to be brought out from the gages 16 as well as to equalize pressures on the inner and outer sides of sleeve 19.

Atmospheric passages 24 extend through the base 17 so that the entire area from the lower portion of column 14 to the shell 18 is exposed to atmospheric pressure to balance the entire atmospheric pressure acting on the area within a circle defined by the outer edge of annular diaphragm 20. These upper and lower areas are substantially equal to produce equal and opposite atmospheric forces acting on the sensitive means 15 thereby to prevent variations in atmospheric pressure influencing the true force to be measured as applied to the end of the column 15.

The elastic sealing means between the force transmitting element and the respective housing surface are chosen at random in both embodiments and can be replaced by other suitable equivalent means. Diaphragms may be used instead of the bellows 6 and 7 (FIG. 1), and bellows instead of the diaphragms 20, 21 (FIG. 2). Moreover, the elastic means are apt to form more or less complete housing surfaces.

It will, of course, be understood that various changes in details of construction and arrangement of parts may be made by those skilled in the art without departing

I claim:

1. A force measuring device comprising an airtight housing, a force responsive element, means mounting said force responsive element in said housing with at least one part thereof fixed in relation to said housing, means extending from another part of the force responsive element to the exterior of the housing for transmitting forces to said element responsive to an applied load to be measured, means sealing the force transmitting means with said housing and thereby subjecting said other part of said element to ambient environmental pressure force in one direction, other means sealing said other part of said element with said housing and subjecting said other part of said force responsive element to an ambient environmental pressure force substantially equal in magnitude but opposite in direction to the other pressure force acting on the force responsive element, thereby to eliminate the effects of changes in said ambient environmental pressure on the force responsive element, the force transmitting means and force responsive element being in coaxial column formation and the opposing sealing means comprising annular diaphragms extending substantially radially with respect to the column axis for connection to the housing.

2. A force measuring device comprising, an airtight housing, a force responsive element mounted therein, force transmitting means extending from the force responsive element to the exterior of the housing, means for sealing the force transmitting means with said housing so that the force responsive element is subjected in one direction to an atmospheric pressure force, other sealing means connected to said housing and to said force responsive element for subjecting the force responsive element to an atmospheric pressure force substantially equal in magnitude but opposite in direction to the other pressure force acting on the force responsive element, thereby to eliminate the effects of changes in atmospheric pressure on the force responsive element, the force transmitting means and force responsive element being in coaxial column formation one end of which is in fixed engagement with said housing and the other end of which extends freely to receive an applied load to be measured, sleeve means in surrounding relationship to the column, means connecting the sleeve means to the column at said other end thereof, said sealing means comprising first diaphragm means hermetically sealing said housing with the column at said other end thereof, and second means including second diaphragm means hermetically sealing the sleeve means to the housing at a location axially spaced from said other end and hermetically sealing the exterior of the force responsive element to the housing at a location axially spaced from said other end, the total surface area of said device exposed to atmospheric pressures within the boundary of the outer periphery of said first sealing means being substantially equal to the total surface area of said device exposed to atmospheric pressures within the boundary of the outer periphery of said second sealing means, whereby atmospheric pressure changes acting on such areas substantially cancel each other so as to have substantially no effect on the force responsive element.

3. A force measuring device comprising an airtight housing, a force responsive element in the form of a rod-like member having at least one electrical strain gage mounted thereon, means mounting said member with said gage thereon in said housing with at least one part thereof fixed in relation to said housing, means extending from another part of the member to the exterior of the housing for transmitting forces to said member responsive to an applied load to be measured, means sealing the force transmitting means with said housing and thereby subjecting said other part of said member to force related to ambient environmental pressure, and other means sealing said other part of said column with said housing and subjecting said other part of said member to force related to ambient environmental pressure substantially equal in magnitude but opposite in direction to the other force related to pressure acting on said member, thereby to substantially eliminate the effects of changes in said ambient environmental pressure on said member and strain gage, said strain gage being mounted on the member between the said parts thereof and being sealed within said housing by said sealing means.

References Cited in the file of this patent

UNITED STATES PATENTS 3,024,649     Taber _____ Mar. 13, 1962

FOREIGN PATENTS 934,316     France _____ Jan. 10, 1948